Sept. 21, 1943.    J. B. NOWAK ET AL    2,329,935
UNION
Filed Sept. 25, 1941    2 Sheets-Sheet 1
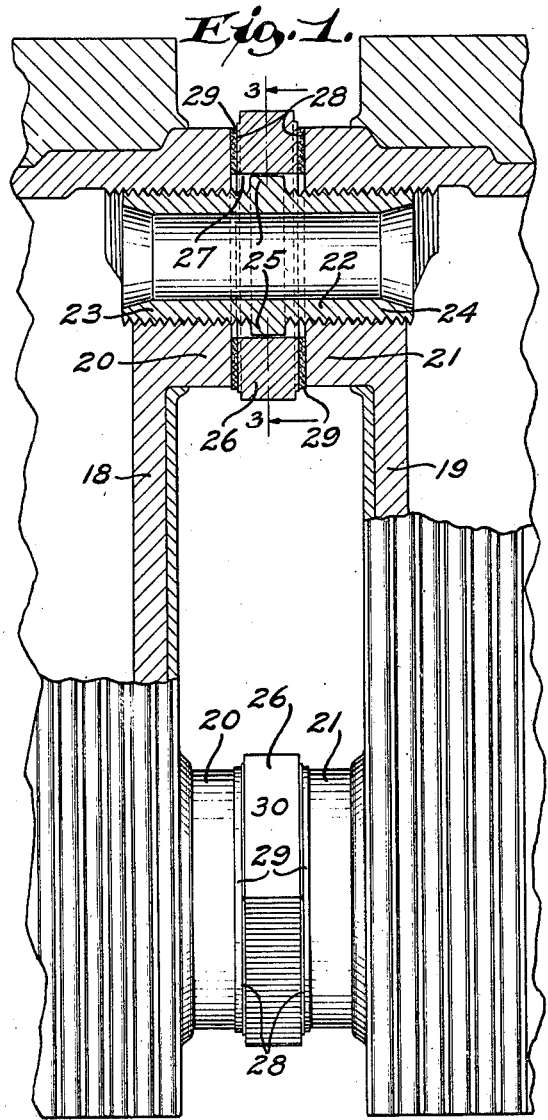
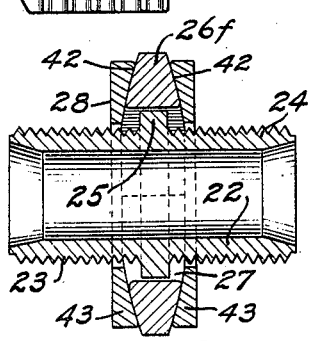
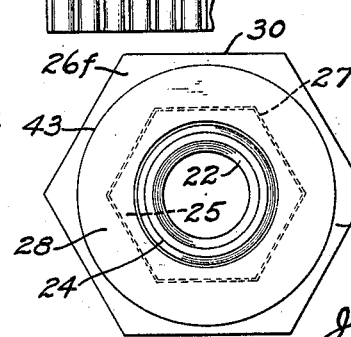
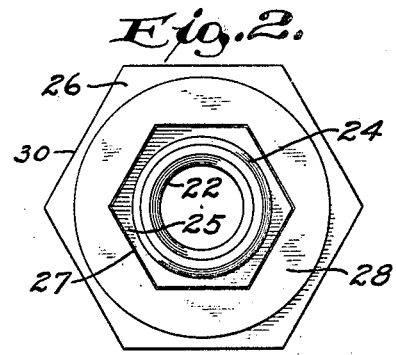
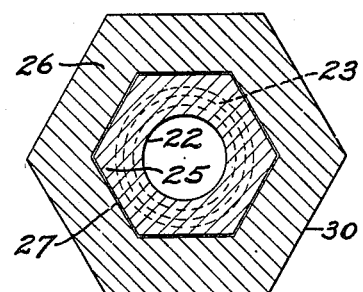
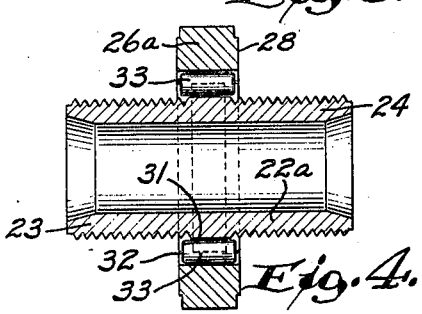
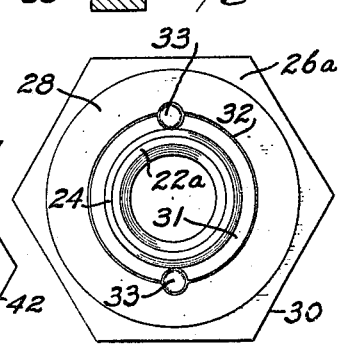
INVENTORS
J. B. Nowak
E. A. Preston
J. W. Sargent
Lieber & Lieber ATTORNEYS.

Sept. 21, 1943.                J. B. NOWAK ET AL                2,329,935
                                    UNION
                Filed Sept. 25, 1941              2 Sheets-Sheet 2
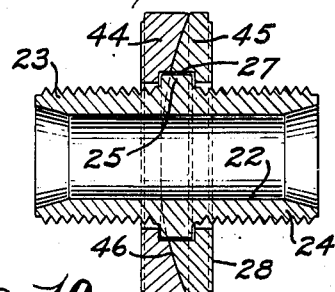
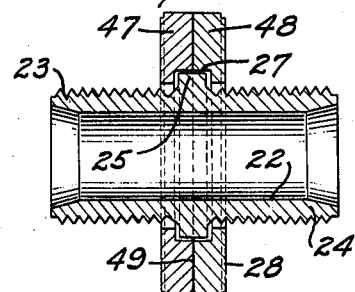
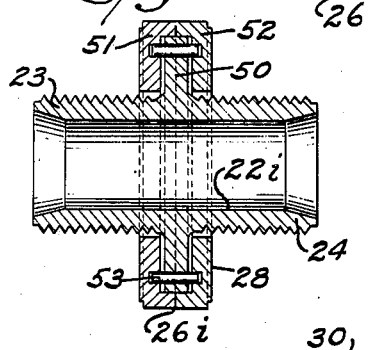
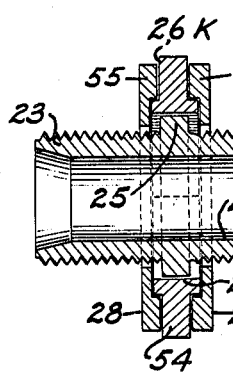
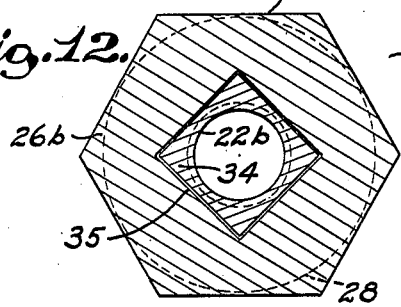
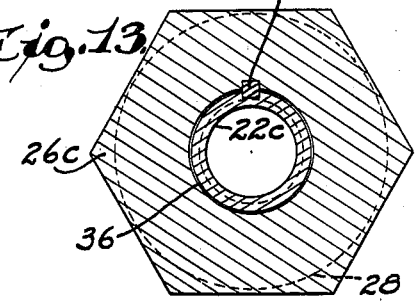
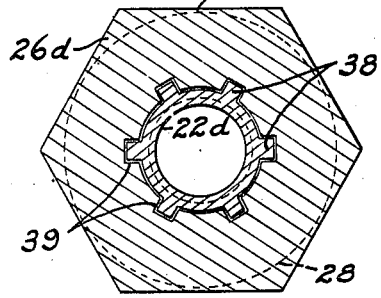
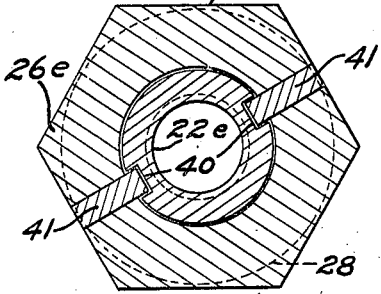
INVENTORS
J. B. Nowak
E. A. Preston
J. W. Sargent
BY Lieber & Lieber ATTORNEYS.

Patented Sept. 21, 1943

2,329,935

UNITED STATES PATENT OFFICE 2,329,935

UNION

John B. Nowak, Everett A. Preston, and John W. Sargent, Wausau, Wis., assignors to D. J. Murray Manufacturing Co., Wausau, Wis., a corporation of Wisconsin Application September 25, 1941, Serial No. 412,212

4 Claims. (Cl. 285—145)

The present invention relates generally to improvements in the art of interconnecting machine parts or the like, and relates more specifically to improvements in the construction and operation of unions for firmly but detachably connecting hollow elements such as radiator sections.

An object of our invention is to provide an improved connecting device for machine elements, tubular or other hollow members, or the like, which is simple and compact in construction, and highly effective in use.

When assembling radiator grid sections or the like, it is desirable to firmly but detachably interconnect the adjacent sections by means of tubular connectors such as pipe nipples, and it is also extremely desirable to have these connecting devices leak proof. While ordinary pipe nipples having right and left hand threads at the opposite ends thereof coacting with the respective adjacent sections, have heretofore been extensively used, it is difficult to apply these threaded nipples in such manner that leakage of fluid from within the hollow sections will not occur, especially when the assemblages are not carefully machined and are subject to extreme variations in temperature or pressure. It is also very difficult to simultaneously apply several of the ordinary pipe nipples to adjacent radiator sections simultaneously, and the use of these ordinary nipples is therefore relatively objectionable for such purposes.

It is therefore an object of our present invention to provide a new and useful union especially adapted to firmly but detachably interconnect adjacent hollow members such as radiator sections, at one or more localities, and to provide sealed joints at the points of connection.

Another object of this invention is to provide an improved tubular or hollow connecting fitting for hollow radiator sections or the like, and means associated with the fitting for facilitating manipulation thereof and for providing leak-proof seals between the sections.

A further specific object of the present invention is to provide an improved pipe coupling which is associable with the interior and extreme ends of the connected pipe sections, to provide a firm union and effective seal disposed approximately within the external pipe diameter or bounding surface of the pipe ends.

Still another specific object of our invention is to provide an improved pipe nipple and seal assemblage, one or more of which can be readily and effectively simultaneously applied to or removed from adjacent machine elements or members.

An additional specific object of the present invention is to provide an improved union for detachably but rigidly connecting adjacent parts of a machine or other structure, which may be manufactured and at moderate cost, and which may be rapidly and safely applied and removed.

These and other specific objects and advantages will be apparent from the following detailed description.

A clear conception of a number of embodiments of the invention, and of the mode of constructing and of utilizing the improved unions, may be had by referring to the drawings accompanying and forming a part of this specification wherein like reference characters designate the same or similar parts in the various views.

Fig. 1 is a part sectional side elevation of a fragment of a radiator grid section assemblage, showing one type of the improved union in longitudinal section and in elevation;

Fig. 2 is an end view of the union shown in Fig. 1, detached from the radiator;

Fig. 3 is a central transverse section through the union of Figs. 1 and 2, taken along the line 3—3 of Fig. 1;

Fig. 4 is a longitudinal central section through a modified union of the type shown in Figs. 1 to 3;

Fig. 5 is an end view of the modified union of Fig. 4;

Fig. 6 is a longitudinal central section through a modified type of union having self-alining sealing rings;

Fig. 7 is an end view of the self-alining type of union shown in Fig. 6;

Fig. 8 is a longitudinal central section through another form of the self-alining type of union;

Fig. 9 is a longitudinal central section through a modified type of union having a two part manipulating and sealing element applied to a nipple of the type in Figs. 1 to 3;

Fig. 10 is a longitudinal central section through a modified union with two part sealing element applied to a centrally flanged nipple;

Fig. 11 is a longitudinal central section through a further modified union with sealing rings formed separate from the manipulating element;

Fig. 12 is a transverse central section through a union of the type shown in Figs. 1 to 3, but having a square instead of a hexagonal central nipple section;

Fig. 13 is a transverse central section through a modified union comprising an ordinary pipe nipple and special manipulating and sealing element;

Fig. 14 is a transverse central section through a further modified union having radial fins between the nipple and sealing element; and Fig. 15 is a transverse central section through still another modified union assemblage.

While our invention has been shown and described herein as having been applied to various types of nipple and sealing element assemblages especially adapted to firmly but detachably interconnect hollow parts such as radiator sections, it is not desired to thereby unnecessarily restrict the scope or utility of the improved device which may be utilized either singly or in multiple.

Referring especially to Figs. 1, 2 and 3, the improved hollow union shown therein is especially adapted to rigidly but detachably connect a pair of adjacent members such as grid radiator sections 18, 19, the former having one or more internally threaded bosses 20 disposable in axial alinement with a similar but oppositely threaded boss or bosses 21 on the other section 19; and each union assemblage comprises a tubular member or nipple 22 having opposite externally right and left hand threaded ends 23, 24 and an intervening hexagonal central portion 25; and a manipulating and sealing element 26 having a hexagonal central hole 27 loosely embracing the nipple portion 25, the element 26 also being provided with opposite flat parallel faces 28 which are co-operable with the radiator section bosses 21, 22 through annular sealing washers or gaskets 29.

Each nipple 22 preferably has its polygonal central portion 25 either formed integral therewith, or rigidly attached thereto, so that the tubular nipple can be rotated by application of a wrench to the outer hexagonally arranged faces 30 of the corresponding manipulating element 26; and it is preferable to provide means for imparting simultaneous rotation to all of the elements 26 associated with an assemblage such as shown in Fig. 1, in order that the sections 18, 19 will always remain parallel to each other. This desired result can be accomplished by merely connecting the swinging ends of the handles of the several wrenches by a link of the same length as the distance between the axes of the several nipples 22, so that oscillation or swinging of either wrench will correspondingly swing the other. The loose fit between the periphery of the hexagonal central portion 25 of each nipple 22, and the similarly shaped central hole 27 in the embracing element 26, is important in order to permit the element 26 to swing or slide laterally so as to properly engage the sealing washers 29.

During normal use of the improved union just described, in order to firmly interconnect two parts such as the radiator sections 18, 19, it is only necessary to properly start the right and left hand threads of the nipple ends 23, 24 within the internal screw threading of the adjacent bosses 20, 21, and to thereafter rotate the union by application of a wrench to the central manipulating and sealing element 26. As the sections 18, 19 are drawn toward each other and approach final connected position, the flat side faces of the element 26 will engage the sealing gaskets 29 and will clamp the same against the outer ends of the bosses 20, 21, thereby providing a tight and leak-proof seal between the sections 18, 19 and the union when the element 26 is finally driven home. In case the ends of the bosses 20, 21 are not perfectly smooth or precisely parallel to each other, the element 26 may swing slightly relative to its carrying nipple 22, so as to compensate for the irregularity, and the pliable washers 29 may be somewhat distorted in order to insure tight sealing. In order to disconnect the parts or sections 18, 19, it is only necessary to reverse the direction of rotation of the manipulating and sealing element 26, whereupon the seal will be broken and the nipple ends 23, 24 will be withdrawn from the adjacent bosses 20, 21.

While the type of union shown in Figs. 1, 2 and 3 can be readily constructed and manipulated and is perfectly satisfactory in use, it is subject to various modifications. In Figs. 4, 5 and 12 to 15 inclusive, are shown five modifications of the type of the improved union wherein the threaded nipple is embraced by a single or one-piece manipulating and sealing element. In the embodiment of Figs. 4 and 5, the modified nipple 22a has opposite ends 23, 24 provided with right and left hand threads, but the central portion of this nipple 22a is provided with an annular flange 31 loosely fitting a circular hole 32 in the modified manipulating and sealing element 26a. The nipple flange 31 and the element 26a are drivingly connected by means of diametrically opposite parallel pins 33 loosely inserted in registering notches in these parts, and this structure can be machined by turning, boring and drilling. The modified structure of Fig. 12 is similar to that of Figs. 1, 2 and 3, except that the nipple 22b has a square central portion 34 loosely coacting with a square central hole 35 in the modified manipulating and sealing element 26b; and in Fig. 13 a cylindrical nipple 22c is employed in conjunction with a modified element 26c having a circular central opening 36 loosely embracing the nipple 22c, and the parts are drivingly interconnected by means of a key 37. In the modification of Fig. 14, the special nipple 22d has a series of central radial fins 38 loosely coacting with adjacent radial slots 39 formed in the modified manipulating element 26d; and in Fig. 15, the nipple 22e is thickened at its medial portion and is provided with sockets 40 which are loosely but drivingly engaged by opposite but alined radial pins 41 driven through holes in the modified element 26e. It will be noted that while all of these modifications comprise two essential parts, namely, a right and left hand threaded nipple, and a one-piece sealing and manipulating element drivingly associated with the nipple, these parts are loosely connected so that the manipulating element may find a proper seating upon the gaskets 29.

In some cases, it may also be desirable to provide for more effective automatic sealing, by forming each driving and sealing element of several relatively movable and self-alining pieces. Such structures are revealed in Figs. 6 to 11 inclusive, and in Figs. 6 and 7 the same type of nipple 22 is used as in Figs. 1 to 3 inclusive. The central hexagonal portion 25 of this nipple 22 in Figs. 6 and 7, is loosely disposed within the central hole 27 of a hexagonal element 26f having opposite spherical zone side surfaces 42 with which sealing rings 43 coact, and these rings 43 have inner spherical zone surfaces snugly but slidably engageable with the surfaces 42 and are provided with outer flat surfaces 28 adapted to engage the sealing gaskets 29, whereby the rings 43 may tightly clamp the gaskets against the ends of the bosses 20, 21. In the self-alining union assemblage shown in Fig. 8, the nipple 22 is also the same as that used in Figs. 1 to 3 inclusive, but the manipulating and sealing element 26g is formed of two parts 44, 45 the former of which has a spherical concave surface 46 snugly coacting with a similarly formed convex surface on the other part 45. Each part 44, 45 has an outer flat surface 28 adapted to coact with a sealing gasket 29, and the element parts are also provided with alined hexagonal central holes 27 loosely cooperating with the central portion 25 of the nipple 22 so that the parts 44, 45 may tilt slightly relatively to the nipple and to each other. In the modification of Fig. 9, the nipple 22 is likewise the same as in Figs. 1 to 3 inclusive, but the manipulating and sealing element 26h is formed of two similar parts 47, 48 coacting along a central plane surface 49; while in the modification of Fig. 10, the nipple 22i has a large central flange 50 which is loosely but drivingly secured to similar half parts 51, 52 of a special manipulating element 26i, by means of transverse parallel pins 53. In the embodiment of Fig. 11, the nipple 22 is like that of Figs. 1 to 3, but the element 26k is composed of a central hexagonal member 54 having a hexagonal hole 27 coacting with the nipple portion 25, and two similar rings 55, 56 slidably coacting with the member 54 and engaging the gaskets 29 along plane faces 28; and in all of the modifications just described, the manipulating and sealing element is obviously composed of several relatively movable parts.

The normal use and operation of the various modifications shown and described should be clearly apparent from the description of the operation of the union disclosed in Figs. 1 to 3 inclusive. All of the improved unions may be used either singly or in multiple, and in each case the central manipulating and sealing element may be formed of such external dimensions that the entire union may be disposed approximately within the external dimensions of the connected conduits so as to provide a flush joint. While numerous modifications have been illustrated and described, the invention is susceptible to further modifications, and all of the types shown may be manipulated with an ordinary wrench. In each case, the screw threads formed on the nipple ends 23, 24 should be formed to permit the parts 18, 19 to be drawn into snug engagement with the sealing gaskets or washers 29; and if no passage through the nipple 22 is required, a solid threaded element may be used in place of a hollow nipple.

From the foregoing detailed description it will be apparent that our present invention provides an improved connecting and sealing union which is simple, compact and durable in construction and highly effective in use. The improved union not only rigidly interconnects the parts, but also thoroughly seals the joints against leakage; and in the event that subsequent leakage should develop, simple rotation of the central element will again re-establish the seal. The sealing is also effected without stressing the threads of the nipple or connecting element, by virtue of the loose connection between the manipulating and sealing element and the nipple, and this connection not only permits tilting of the central element, but also permits this element to slide along the nipple. The improved unions can moreover be manufactured and sold at moderate cost, may be quickly and safely applied or removed, and are adaptable for various uses.

It should be understood that it is not desired to limit this invention to the exact details of construction and operation herein shown and described, for various modifications within the scope of the appended claims may occur to persons skilled in the art.

We claim:

1. In a union, a pipe nipple having right and left hand threads at its opposite ends for effecting simultaneous attachment thereof to adjacent objects, and a manipulating element loosely embracing said nipple between said ends, said element being formed of several coacting parts and being both slidable along and bodily tiltable relative to said nipple, and said parts also being tiltable relative to each other about a tilting point disposed on the central nipple axis.

2. In a union, a pipe nipple having right and left hand threads at its opposite ends for effecting simultaneous attachment thereof to adjacent objects, and a manipulating element loosely embracing said nipple between said ends, said element being formed of several parts coacting along spherical zone surfaces and being both slidable along and tiltable relative to said nipple for sealing engagement with the connected objects.

3. In a union, a pipe nipple having right and left hand screw threads at its opposite ends for effecting simultaneous attachment thereof to adjacent objects, and a manipulating element embracing said nipple between said ends, said element comprising several parts coacting along spherical zone surfaces and being slidable along said nipple and said parts being tiltable relative to each other at said spherical surfaces.

4. In a union, a pipe nipple having right and left hand screw threads at its opposite ends for effecting simultaneous attachment thereof to adjacent objects, and a manipulating element embracing said nipple between said ends, said element comprising several parts coacting along spherical zone surfaces and being bodily slidable along said nipple and said parts being tiltable relative to each other at said spherical surfaces and about a tilting point disposed on the central nipple axis.

JOHN B. NOWAK.
EVERETT A. PRESTON.
JOHN W. SARGENT.